(12) United States Patent
Kamalaksha et al.

(10) Patent No.: US 7,698,001 B2
(45) Date of Patent: Apr. 13, 2010

(54) METHOD AND APPARATUS FOR IMPROVING PERFORMANCE OF NETWORKING APPLICATIONS

(75) Inventors: Venkataraman Kamalaksha, Karnataka (IN); Ganesh Handige Shankar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 11/580,365

(22) Filed: Oct. 13, 2006

(65) Prior Publication Data

US 2007/0097979 A1    May 3, 2007

(30) Foreign Application Priority Data

Oct. 27, 2005   (IN)   .................... 2874/DEL/2005

(51) Int. Cl.
    *G05B 19/18* (2006.01)
(52) U.S. Cl. ................ 700/2; 700/3; 700/4; 700/6; 700/7; 370/232; 370/234
(58) Field of Classification Search ........ 370/252, 370/232–234; 700/3–4, 6–7, 2
    See application file for complete search history.

(56) References Cited

U.S. PATENT DOCUMENTS

| | | | | |
|---|---|---|---|---|
| 6,418,517 | B1 * | 7/2002 | McKenney et al. | 711/151 |
| 6,937,568 | B1 * | 8/2005 | Nicholl et al. | 370/236 |
| 7,133,915 | B2 * | 11/2006 | Benejam et al. | 709/224 |
| 2002/0120741 | A1 * | 8/2002 | Webb et al. | 709/225 |
| 2002/0174419 | A1 * | 11/2002 | Alvarez et al. | 717/168 |

\* cited by examiner

*Primary Examiner*—Huy D Vu
*Assistant Examiner*—Omer Mian

(57) ABSTRACT

A method for improving performance of networking applications which receive network data from a computer network and which are executable on any one of a plurality of data processing means. The proposed method comprises the steps of establishing a data transfer connection between a first data processing means of the plurality of data processing means and the computer network; sending data on the data transfer connection by means of a given networking application of a plurality of networking applications, the given networking application running on a second data processing means of the plurality of data processing means; determining a quality measure of the data transfer connection from the sent data; and moving the given networking application to the first data processing means if the quality measure meets a predefined criterion.

14 Claims, 5 Drawing Sheets

METHOD AND APPARATUS FOR IMPROVING PERFORMANCE OF NETWORKING APPLICATIONS

BACKGROUND OF INVENTION

In connection with computer networks, e.g. within an enterprise, it is be considered common practice to deploy servers with multiple data processing means—hereinafter also referred to as processors or CPUs—and network interface cards (NICs) to enable the server to deal with higher network traffic and higher processing load. Due to the hardware and the software architecture of these servers in the above-mentioned situations there are a number of issues which can impair the overall performance of networking applications running on the server. For instance, any data handled by a processor on a computer is first brought from the main memory to the processor's cache after which the processor will proceed to work on the data. This may involve multiple read and write procedures. After the processor has finished processing a given amount of data, said data is written from the cache back to main memory. This is much faster than accessing the main memory for every access to the data and dramatically improves performance of the computer in general.

However, on a system with more than one processor, if different processors have to work on the same data, that data will have to be moved from the cache of one processor to the main memory of the computer and from there to the cache of the other processor. This can introduce delays which can have a negative effect on overall system performance. Furthermore, on a prior art system with multiple processors, every network interface card is programmed to interrupt a particular processor when there is data arriving from the computer network, e.g. in the form of an incoming data packet. The respective NIC then hands over the data packet to the processor which will continue to process the packet across various networking layers, e.g. network, transport, session, or presentation layers, until the data is finally placed into the data buffer of the recipient application (application layer). However, as a NIC is programmed to interrupt a particular CPU, and the packet that it receives from the computer network may be destined to an application that is running on a different CPU, the data received from the computer network will have to be transferred to the cache of the processor that is actually running the application. As illustrated above, this will introduce delays, which in turn affect system performance.

BRIEF DESCRIPTION OF THE DRAWINGS

Embodiments of the invention will now be described by way of example only with reference to the drawings in which.

DETAILED DESCRIPTION OF EMBODIMENTS OF THE INVENTION

Figure 1:
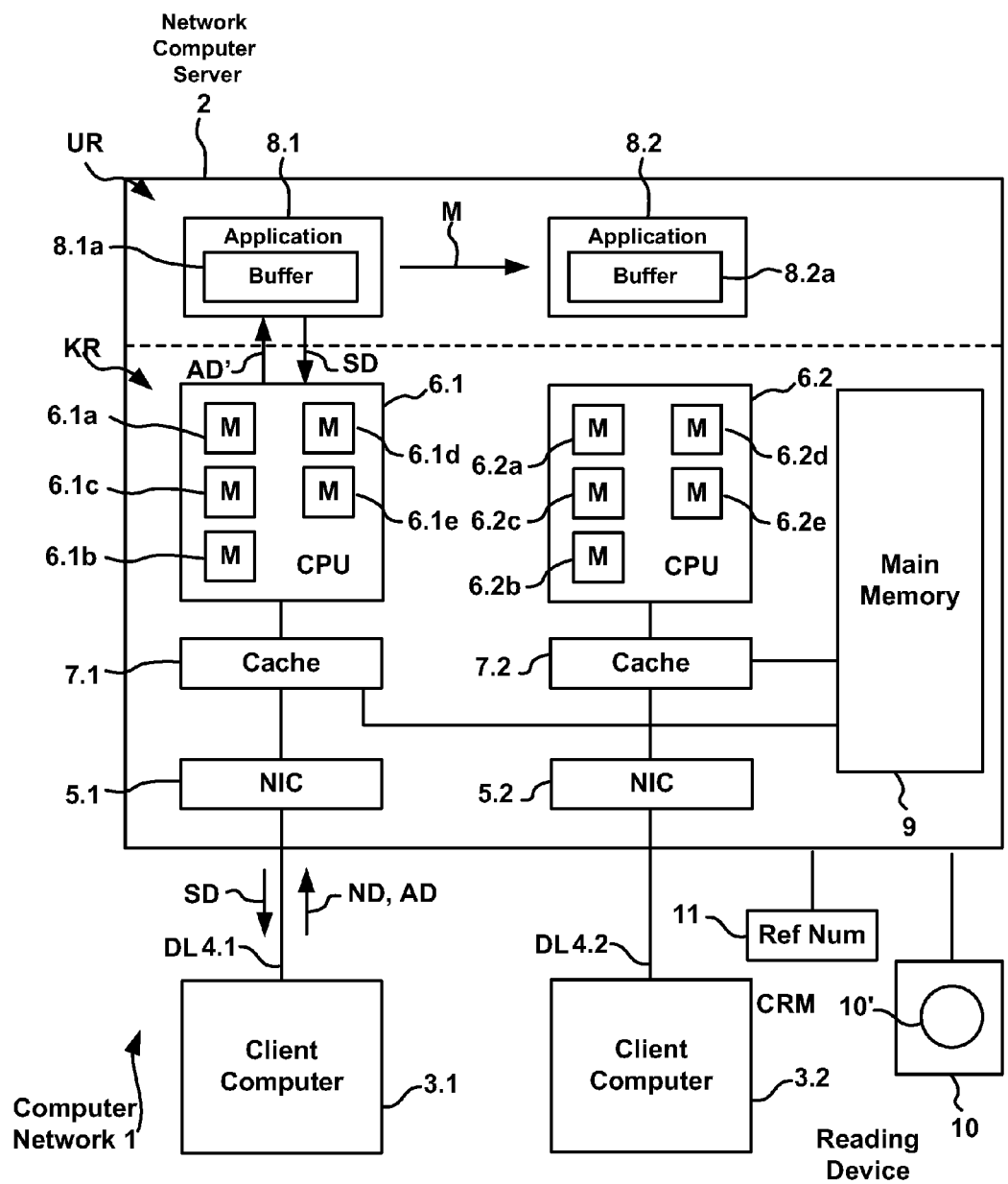
FIG. 1 is a schematic block diagram of a computer network in accordance with an embodiment of the invention.

In accordance with one aspect of the present technique there is provided a method for improving the performance of networking applications which receive data from a computer network and which are executable on any one of a plurality of data processing means, said method comprising the steps of:
  establishing a data transfer connection between a first data processing means of the plurality of data processing means and the computer network;
  sending data on said data transfer connection by means of a given networking application of a plurality of networking applications, said given networking application running on a second data processing means of the plurality of data processing means;
  determining a quality measure of said data transfer connection from the sent data, and moving the given networking application to the first data processing means if the quality measure meets a predefined criterion.

In this way, in an embodiment of the method according to the technique disclosed, the given networking application is moved to the same processor at which data (data packets) arrive from the computer network. This ensures that the entire packet is processed on one processor, thus providing the maximum benefit of code and data caches. In other words: Processing all the data on the same processor will boost performance through code affinity, i.e., the code will make best use of processor cache. However, migration of the application will be useful only if the data transfer connection in question meets a certain quality measure. To this end, data sent by the networking application is used to determine said quality measure, and the migration is done only if a corresponding criterion is met. Since such a migration feature may not be useful in all circumstances and/or for all users, in accordance with an embodiment of the technique it is proposed to devise said feature as a system tunable. That is, the entire idea of application migration—hereinafter also referred to as process migration—is performed only if the tunable is turned on.

Making use of the above-described basic concept of application migration, according to a second aspect of the disclosure there is provided a network server computer for use in a computer network, comprising:
  a plurality of data processing means;
  a plurality of networking applications executable on substantially any one of said data processing means; and
  a plurality of network interface cards, each of said network interface cards being associated and in operative connection with at least one of said data processing means,
wherein the network interface cards are adapted to interrupt the associated data processing means upon receiving network data from the computer network, wherein a given data processing means is adapted for establishing a data transfer connection with the computer network upon interruption by one of said network interface cards, and wherein a given networking application is adapted to receive application data from the computer network on said data transfer connection, the network server computer further comprising at least a first program code mechanism adapted to move said given networking application to said given data processing means and operable if a quality measure of said data transfer connection meets a predefined criterion.

Nevertheless, process migration is generally more useful in situations where retransferring the data to the main memory and from there to the cache of another processor effectively is the bottleneck of data processing. In other words: If, e.g., the data transfer connection with the computer network effectively is responsible for slow data processing, then migrating the application would not lead to a decrease in processing time. Thus, in another embodiment of the method according to the technique disclosed the given networking application is moved only if a data transfer rate of said data transfer connection exceeds a predetermined threshold value.

According to a corresponding embodiment of a network server computer in accordance with the present technique, the first program code mechanism is operable if a data transfer rate on said data transfer connection exceeds a predetermined threshold value.

In order to determine the data transfer rate on the data transfer connection, at least some data has to be sent. In this context, according to a further embodiment an inventive network server computer according to a further aspect of the technique comprises a program code mechanism adapted to determine a start time of said data transfer connection, an amount of data transferred on said data transfer connection since said start time, and a present time, and to determine a data transfer rate on said data transfer connection from a difference between the present time and the start time and the amount of transferred data.

Within the scope of a further embodiment of the method in accordance with the technique disclosed, the data sent by the given networking application substantially comprises system calls by said networking application for obtaining application data from said data transfer connection. In this way the data transfer rate can be determined—and the application can be moved—before the application actually starts to read application data from the computer network.

In order to facilitate migration of a given application to a particular CPU which receives the corresponding application data from the computer network, said CPU must be identifiable by the upper protocol layers, e.g. the application layer. Therefore, in another embodiment of the method according to the disclosure an identification of the first data processing means, i.e. a processor ID, is stored in an encapsulating data structure encapsulating the network data for propagation to higher protocol layers, in particular transport and/or application layers.

The method in accordance with the present technique thus provides storing the processor ID in a network data packet and propagating it to the upper layers by means of said encapsulating data structures. To the same end, in a further embodiment of the method in accordance with the present disclosure an identification of the first data processing means is stored in a socket data structure associated with said data transfer connection on a higher protocol layer, in particular a transport layer, for retrieving an identity of the first data processing means and for moving the given networking application to the first data processing means. The method thus enables the upper layer (socket layer) to retrieve the processor ID from the encapsulating data structure and move the networking application to the processor associated with that processor ID.

In corresponding embodiments, said server computer comprises a second program code mechanism and a third program code mechanism, respectively. The second program code mechanism is operable on a lower protocol layer, in particular a network layer, and is adapted to capture an identification of the given data processing means in an encapsulating data structure comprising the network data and to transfer the encapsulating data structure to a higher protocol layer, in particular a transport layer. The third program code mechanism is adapted to retrieve said identification from the encapsulating data structure and to store said identification in a socket data structure associated with said data transfer connection, said socket data structure being accessible by the first program code mechanism for retrieving said identification.

Thus in a further aspect, embodiments of the method comprise the following two stages of 1) identifying the processor which is interrupted by the NIC in question, and 2) when data transfer rate for a connection exceeds a threshold value, migrate the process which receives data (packets) from this NIC to the identified processor.

According to a third aspect there is provided a computer network, comprising:
    at least one client computer,
    at least one network server computer, and
    at least one data link connecting the at least one client computer with the at least one network server computer, said network server computer comprising:
    a plurality of data processing means,
    a plurality of networking applications executable on essentially any one of said data processing means,
    a plurality of network interface cards, each of said network interface cards being associated and in operative connection with at least one of said data processing means, wherein the network interface cards are adapted to interrupt the associated data processing means upon receiving network data from the client computer, wherein a given data processing means is adapted for establishing a data transfer connection with the client computer upon interruption by one of said network interface cards, and wherein a given networking application is adapted to receive application data from the client computer on said data transfer connection, the network server computer further comprising at least a first program code mechanism adapted to move said given networking application to said given data processing means and operable if a quality measure of said data transfer connection meets a predefined criterion.

In order to make use of the above-described advantages of the technique disclosed, further embodiments of the computer network comprise various respective embodiments of the network server computer, as previously described.

According to a fourth aspect the above-described concept of application migration may be implemented by means of a computer program product for use on a network server computer for improving performance of networking applications which receive application data from a computer network and which are executable on any one of a plurality of data processing means comprised in said network server computer, the computer program product being operable to:
    establish a data transfer connection between a first data processing means of the plurality of data processing means and the computer network;
    send data on said data transfer connection by means of a given networking application of a plurality of networking applications, said given networking application running on a second data processing means of the plurality of data processing means;
    determine a quality measure of said data transfer connection from the sent data; and
    move the given networking application to the first data processing means if the quality measure meets a predefined criterion.

In further embodiments of the computer program product, said computer program product is operable to translate in action the various respective embodiments of the method, as previously described.

Alternatively, according to a fifth aspect, the above-described application migration technique may also be implemented by means of a computer program product for use on a network server computer for improving performance of networking applications which receive application data from a computer network and which are executable on any one of a plurality of data processing means comprised in said network server computer, wherein a given networking application of said plurality of networking applications receives application data from the computer network on a data transfer connection established by means of a given data processing means of said plurality of data processing means upon reception of corresponding network data from the computer network, the computer program product being operable to provide a first program code mechanism adapted to move said given networking application to said given data processing means for execution by said given data processing means if a quality measure of said data transfer connection meets a predefined criterion.

In further embodiments of the computer program product in accordance with said fifth aspect, said computer program product is operable to provide said second, third, and fourth program code mechanisms, as previously described.

Additionally, in still another embodiment of the computer program product in accordance with said fifth aspect, said computer program product is operable to provide a fifth program code mechanism adapted to compare the data transfer rate with a predefined threshold value and to enable the first program code mechanism if the data transfer rate exceeds said threshold value, thus achieving an application migration if the latter will effectively lead to a boost in processor performance.

Further advantages and characteristics of disclosed technique will be understood from the following description of embodiments with reference to the attached drawings. The features mentioned above as well as below can be used in accordance either individually or in conjunction. The embodiments mentioned and illustrated in the figures are not to be understood as an exhaustive enumeration or to be limiting in any way, but rather as examples intended to illustrate embodiments of the disclosure.

The following detailed description of the technique refers to the accompanying drawings. The same reference numerals may be used in different drawings to identify the same or similar elements.

FIG. 1 shows a schematic block diagram of a computer network 1 in accordance with an embodiment of the present disclosure. The computer network 1 comprises a network server computer 2 and a plurality of client computers 3.1, 3.2, only two of which are depicted for reason of clarity. The client computers 3.1, 3.2 are connected to the network server computer 2 by means of respective suitable data links 4.1, 4.2, e.g. Gigabit links, as known to a person skilled in the art. The data links 4.1, 4.2 terminate at respective network interface cards (NICs) 5.1, 5.2 comprised in the network server computer 2. Within its kernel region (KR), the network server computer 2 further comprises a plurality of data processing means 6.1, 6.2 (CPUs) which are coupled with a respective network interface card 5.1, 5.2 via an associated CPU cache memory 7.1 and 7.2, respectively. Again, the computer network 1 in accordance with the illustrated embodiment may comprise more than only two CPUs 6.1, 6.2 alongside with the associated caches 7.1, 7.2 and network interface cards 5.1, 5.2. In FIG. 1 the respective numbers have been limited to two merely for reason of clarity. Furthermore, a plurality of network interface cards may be associated with a common data processing means, i.e. more than one NIC is arranged to interrupt a given CPU. In its user region UR, the network server computer 2 further comprises a plurality of applications 8.1, 8.2, which are executable on either one of the CPUs 6.1, 6.2 and which include respective application data buffers 8.1a, 8.2a. Again, the depicted number of applications has been limited to two merely for reasons of clarity. According to the illustration in FIG. 1, a given application, e.g. application 8.1, is executed by means of the CPU located directly below it, i.e. CPU 6.1. In operative connection with the CPUs 6.1, 6.2 and their respective cache memories 7.1, 7.2 the network server computer further comprises a main memory 9. Furthermore, the data processing means 6.1, 6.2 each include a number of modules or program code mechanisms 6.1a-e and 6.2a-e, respectively, the function of which will be described in detail below. Hereinafter, said program code mechanisms (or modules) will also be referred to as first, second, third, fourth, and fifth program code mechanisms in correspondence with the wording used in the appended patent claims. The network server computer 2 further comprises a reading device 10 for any type of computer-readable media 10', e.g. a CD-ROM drive and a CD-ROM, respectively, such that in particular said program code mechanisms 6.1a-e, 6.2a-e can be provided by means of a suitable computer program product comprised on said computer-readable medium 10'. In addition, reference numeral 11 refers to a user input device, the function of which will also become apparent later.

Any data to be handled by the CPUs 6.1, 6.2 is generally brought from the main memory 9 to the respective cache memory 7.1, 7.2 of a given CPU, after which the processor will proceed to work on the data. This may involve multiple read and write processes. After the CPU 6.1, 6.2 finishes working this data, it is written from the cache memory 7.1, 7.2 back to main memory 9. On the network server computer 2 according to FIG. 1, which has more than one CPU, data will have to move from the cache, e.g. 7.1, of one processor 6.1 to the main memory 9 and from there to the cache 7.2 of the other processor 6.2, if different processors have to work on the same data. This introduces delays which can have a negative effect on overall system performance. It follows that a process, i.e. any procedure involving the above-described data handling, will perform better if all the data needed by that particular process is handled on only one processor. On the network computer system 1 shown in FIG. 1, the NICs 5.1, 5.2 are programmed to interrupt a particular processor 6.1, 6.2 when there is an incoming data packet arriving at a given NIC, e.g. NIC 5.1, as illustrated in FIG. 1 by means of an arrow ND symbolizing a network data packet arriving from client computer 3.1 on data link 4.1. That particular NIC 5.1 then hands over the data packet ND to the processor 6.1 which will continue to process the data packet ND across various networking layers, and the data is finally placed into the data buffer 8.1a of the recipient application 8.1. Thus, a data transfer connection is established by means of a given data processing means, e.g. CPU 6.1. Owing to this configuration, said applications 8.1, 8.2 are also generally referred to as networking applications.

Processing of network data packets ND across various networking layers as such is a technique which is known by a person skilled in the art. In this way, the data received from the network can also be referred to as application data AD arriving from the network for use by a given application 8.1 in the form of processed application data AD', as described above. The application 8.1 may also request data from the network by issuing suitable system calls, as illustrated by means of an arrow SD in FIG. 1.

If a NIC, e.g. NIC 5.1, is programmed to interrupt a particular CPU 6.1 and the network data packet ND that it receives is destined to an application, e.g. application 8.2, that is running on a different CPU, i.e. CPU 6.2, then the data comprised in the network data packet ND will have to be transferred to the cache 7.2 of that other processor 6.2. As described previously, this would introduce delays, which in turn affects system performance of both the network server computer 2 and the entire network 1. On the contrary, processing all the data on the same processor, i.e. either CPU 6.1 or CPU 6.2, will boost performance through code affinity because the code will make best use of the available CPU cache, i.e. either cache 7.1 or cache 7.2. Referring again to the diagram in FIG. 1: If application 8.1 is receiving data from NIC 5.2, said data will be processed by the respective CPU 6.2 and then has to be transferred (via the main memory 9) to CPU 6.1, which is running the application 8.1 in question. However, if application 8.1 is made to run on CPU 6.2 instead, all the data will be processed on one processor, i.e. CPU 6.2, yielding an enhanced system performance. Thus, in the above-described situation application 8.1 is moved for execution to the processor 6.2 which receives the corresponding application data from the NIC 5.2 in question. This is indicated by means of an arrow M in FIG. 1.

To this end, the first program code mechanism 6.1a, 6.2a comprised in the CPU 6.1, 6.2 of the network server computer 2 is adapted to move said networking application 8.1 for execution to said data processing means 6.2 in operable connection with said NIC 5.2. However, in order not to move applications in situations where no gain in performance is to be expected, the first program code mechanism 6.1a, 6.2a is operable only if a quality measure of the data transfer connection from the network to a given application 8.1, 8.2 meets a predefined criterion. In the context of the technique disclosed the data transfer rate on the data transfer connection between an application 8.1, 8.2 and the network, i.e. a particular client computer 3.1, 3.2, provides a well-suited quality measure. Therefore, in a particular embodiment of the computer network server 1 according to the disclosure, the fourth program code mechanism 6.1d, 6.2d is adapted to determine a start time of said data transfer connection, an amount of data transferred on said data transfer connection since said start time, and a present time, and to determine a data transfer rate on said data transfer connection from a difference between the present time and the start time and the amount of transferred data. In addition, the fifth program code mechanism 6.1e, 6.2e comprised in the CPU 6.1, 6.2 of the network server computer 2 is adapted to compare the data transfer rate with a predefined threshold value and to enable the first program code mechanism 6.1a, 6.2a if the data transfer rate exceeds said threshold value, which may be stored in the main memory 9 of the network server computer 2. For instance, in the situation depicted in FIG. 1, the above-mentioned fourth and fifth program code mechanisms 6.2d and 6.2e, respectively, of CPU 6.2 would check on the data transfer rate of the connection to client computer 3.2, and would enable the first program code mechanism 6.2a on CPU 6.2 to move application 8.1 to data processing means 6.2, such that all process data are processed by CPU 6.2 only.

In this way the networking application, e.g. application 8.1, is moved to the same processor on which the data packets arrive. As stated before, this will ensure that the entire packet is processed entirely on only one processor, thus providing the maximum benefit of code and data caches. It will be appreciated by a person skilled in the art that this particular feature in accordance with embodiments of the disclosed technique may not be useful in all circumstances and/or for all users. Hence, it is proposed to devise this application migration feature as a system tunable. That is, the entire idea of process migration is performed only if the tunable is turned on, e.g. by means of a corresponding user input via the input device 11.

In a general way, the above-described method in accordance with the described embodiment of the technique can be split into the following two parts: 1) Identify the processor which is interrupted by the NIC in question, and 2) when data transfer rate for a connection exceeds a threshold value, migrate the process which receives packets from this NIC to the identified processor.

Figure 2:
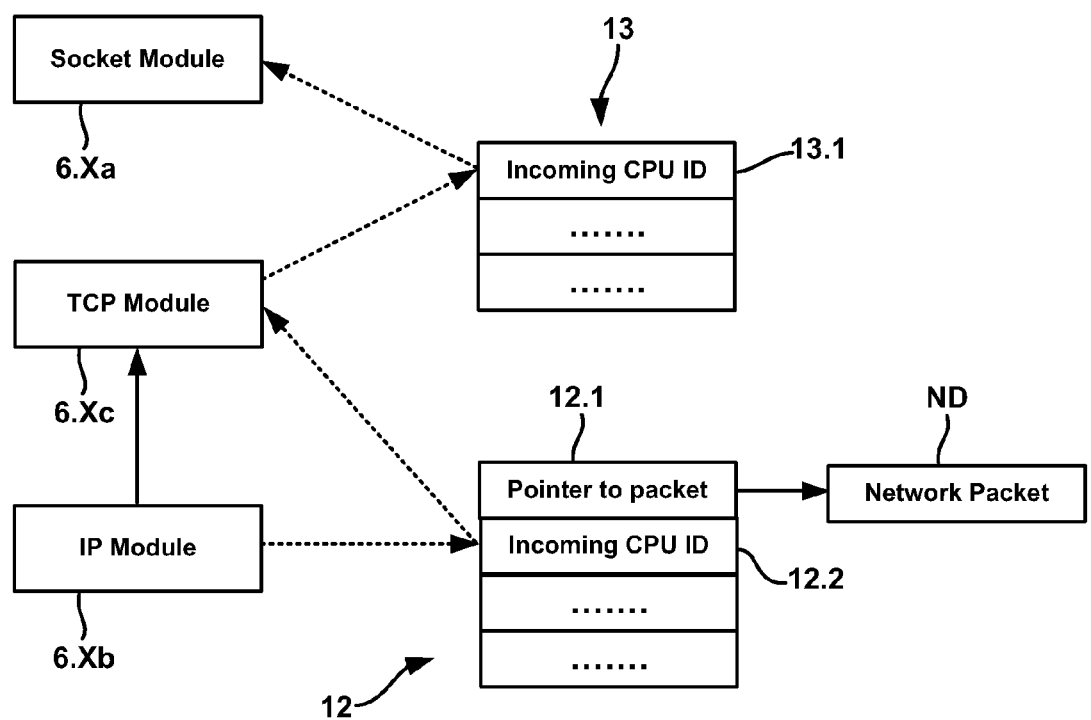
FIG. 2 is a schematic diagram illustrating the concept of identifying, storing, and retrieving an identification of the data processing means on which network data arrives.

FIG. 2 illustrates said concept of identifying the processor which is interrupted by the NIC in question by means of a schematic diagram illustrating the concept of identifying, storing, and retrieving an identification of the data processing means on which network data arrives. On the left-hand side of FIG. 2, there are depicted a number of (software) modules 6.Xa-c which essentially correspond to the first, second, and third program code mechanisms 6.1a-c, 6.2a-c that were described above in connection with FIG. 1, and which will hereinafter be referred to as Socket Module 6.Xa, IP Module 6.Xb, and TOP Module 6.Xc, respectively, where "X" replaces the numbers "1" and "2", respectively. The dashed arrows in FIG. 2 show the direction of data storage. The corresponding data structures 12, 13 are depicted on the right-hand side of FIG. 2 and comprise a number of reserved fields 12.1, 13.1, the significance of which will become apparent later.

In a general way, the IP module 6.Xb stores the information concerning an identification (ID) of the incoming (receiving) CPU, i.e. CPU 6.2 in the above example, into data structure 12. The TCP module 6.Xc retrieves the ID from the data structure 12 and stores it into a socket data structure 13. This will be detailed in the following:

When a network data packet ND is picked up by a network card, e.g. NIC 5.2 (FIG. 1), the latter is preprogrammed to interrupt a particular processor on the system, e.g. CPU 6.2 (FIG. 1). The network data packet ND is then processed by a driver (not shown) and a DLPI module (not shown) located on the same CPU 6.2, as known to a person skilled in the art. The packet is then passed on to the IP module 6.Xb, also located on the same processor, e.g. CPU 6.2 (incoming CPU). The ID of the incoming CPU is captured in the IP module 6.Xb in one of the reserved fields 12.2 of an encapsulating data structure 12 which encapsulates the network data packet ND and sends it upstream to the TCP Module 6.Xc. The TCP module 6.Xc retrieves the incoming CPU ID from the encapsulating data structure 12 and stores it in a socket data structure 13 associated with this particular data stream. Thus, the information about the processor 6.2 on which the network data packets ND arrive for a given connection is known as soon as the first packet has arrived on this connection. The TCP module 6.Xc subsequently sends out packets to complete the three way TCP hand-shake as known to a person skilled in the art, after which a particular application, e.g. application 8.1, will start to send and receive data on this connection. It can be seen from the above description that the CPU 6.2 on which the network data packets are going to arrive is already known some time before the application 8.1 actually begins to use the connection.

As stated above, when a data transfer connection is started, the start time is noted down and recorded in the corresponding socket structure, i.e. data structure 13. The socket structure 13 also keeps track of the total amount of data transferred on that particular connection. The system calls—denoted SD in FIG. 1—used by the application, e.g. application 8.1, for data transfer are modified to determine the data transfer rate. Said modification is such that every time the application sends or receives data, computation is done to determine if the predetermined condition for migrating the application has been met and if so, and the application is migrated to the destined CPU as will be explained in exemplary fashion for a "recv( )" system call in the following paragraph. In accordance with an embodiment of the technique disclosed, the data transfer rate is obtained by dividing the total number of bytes transferred on that particular connection by the difference between the present time and the socket creation time and can be used as a criterion for to determine whether or not the application in question should be migrated. If said criterion is met the process which receives packets from a given NIC, e.g. NIC 5.2, is moved to the associated processor, e.g. CPU 6.2.

For instance, when the networking application, e.g. application 8.1, issues a "recv( )" system call to read data from the data transfer connection, the socket module 6.Xa retrieves the ID of the incoming CPU 6.2 from the socket data structure 13. If the data transfer rate exceeds said predefined threshold value and the application 8.1 is not already running on the same CPU 6.2, it is moved to that CPU 6.2 immediately by the socket module 6.Xa. Hence, the networking application 8.1 is made to run on the CPU 6.2 which achieves optimum network performance. In this way the incoming processor ID is stored in a network packet and propagated it to the upper network/protocol layers by means of the (encapsulating) data structures 12, 13. On the upper layer (socket layer) the processor ID is retrieved from the data structure 13, and the networking application is moved to that particular processor.

Figure 3:
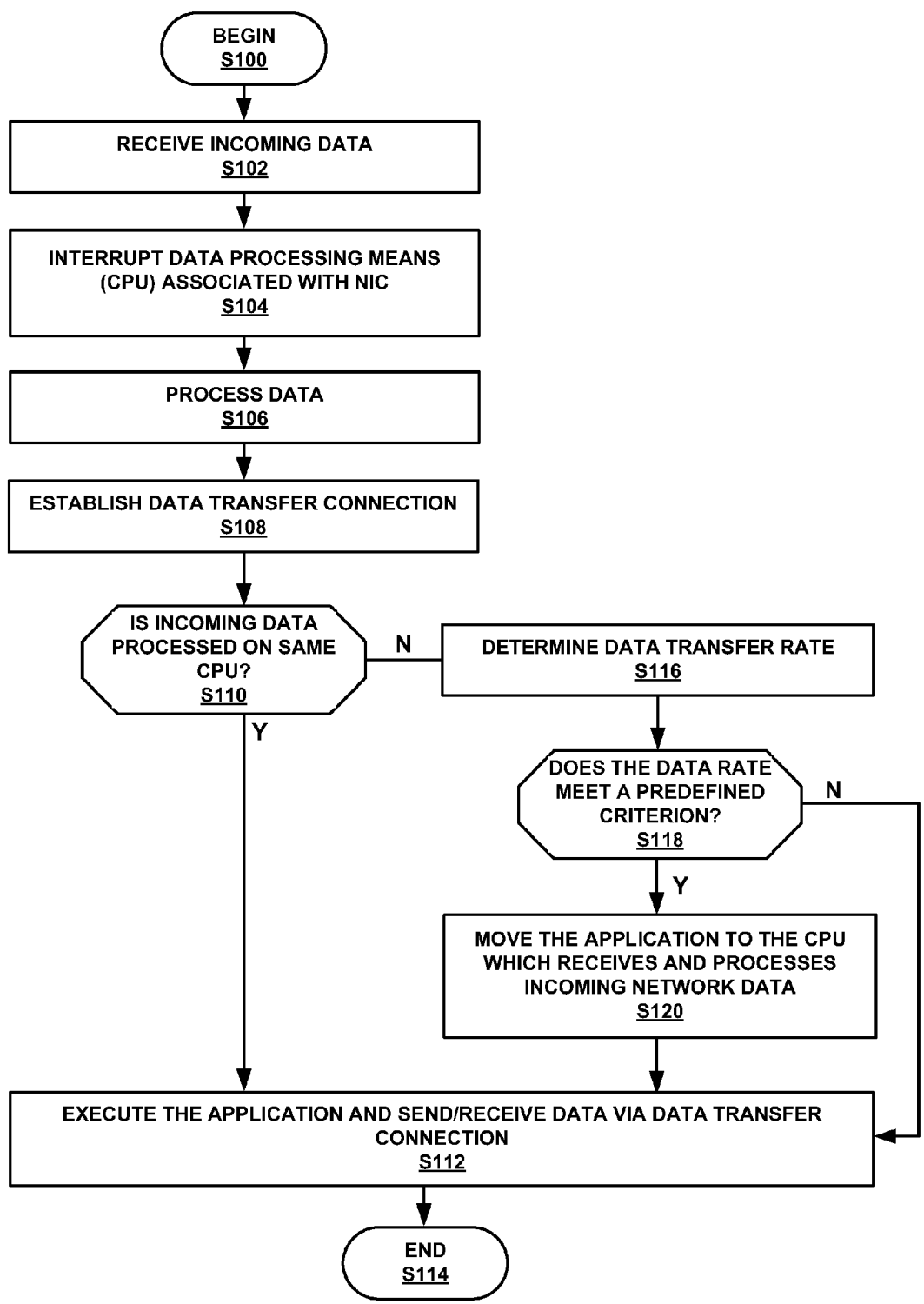
FIG. 3 is a flow chart of the method in accordance with an embodiment of the invention.

FIG. 3 shows a flow chart of the method in accordance with an embodiment of the disclosure. The method commences with step S100. In subsequent step S102, incoming network data is received at a network interface card of a network server computer. In consequence to this, the NIC will interrupt its associated data processing means (CPU) in step S104. Then, in subsequent step S106 the CPU processes the data, as previously described with reference to FIG. 2. Said data processing leads to establishing a data transfer connection between a particular networking application running on the server computer and the network, i.e. a client computer using said application (step S108). In subsequent step S110 it is determined whether or not the incoming application data for use by said networking application and the application itself are processed (executed) on the same CPU. If this question is answered in the affirmative (y), then in step S112 the application is executed and sends/receives data via said data transfer connection; no process migration is necessary in this case. Correspondingly, the method in accordance with the illustrated embodiment of the technique terminates with step S114. However, if said question is answered in the negative (n) then in step S116 the data transfer rate on said data transfer connection is determined. In subsequent step S118 it is determined whether or not the data rate meets a predefined criterion, e.g. whether or not the data rate lies above a predetermined threshold value. If this question is answered in the affirmative (y), then in step S120 the application is moved to the CPU which receives and processes the incoming network data. Again, the method in accordance with this embodiment of the technique terminates with step S114. However, if the question in step S118 is answered in the negative (n) then no gain in performance is to be expected from process migration and the method terminates directly in step S114 without moving said application.

Figure 4:
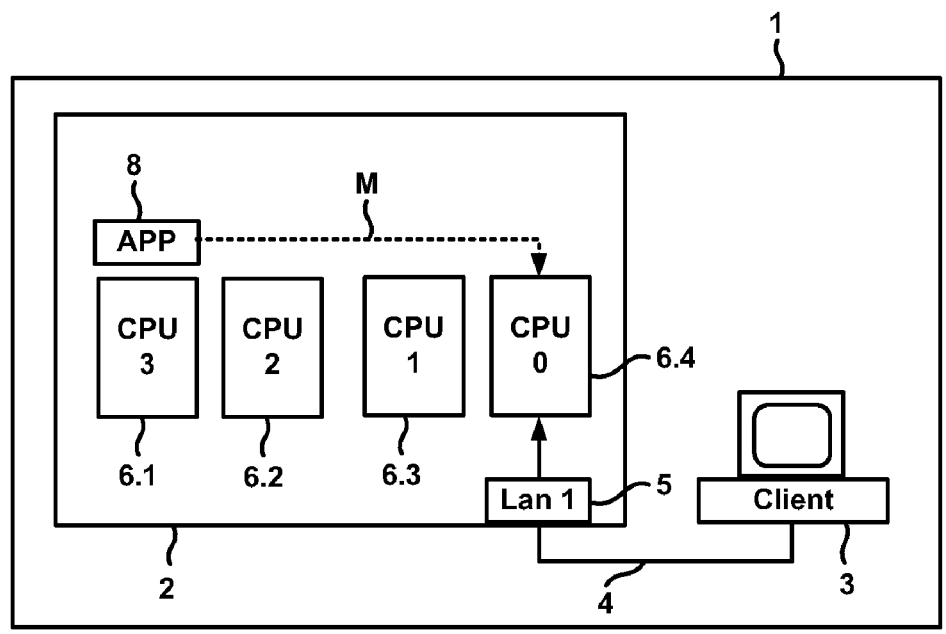
FIG. 4 is a simplified schematic diagram of a computer network used for testing the method.

FIG. 4 shows a simplified schematic diagram of a computer network 1 used for testing the method in accordance with an embodiment of the foregoing description, which is essentially similar to the network explained in detail above with reference to FIG. 1. A single networking application 8 runs on a network server computer 2 with four processors 6.1-6.4 and a Gigabit network interface card 5. The client computer 3 is connected to the network server computer 2 through a direct data link 4 (Gigabit link) to the network interface card 5. The server 2 is configured such that all incoming traffic on the network interface card 5 is processed by CPU0 6.4, and the networking application 8 is made to run on CPU3 6.1.

In the above-described test setup, the networking application 8 is "netserver", and the client computer 3 is running an application called "netperf". The used version of "netperf" is 2.3p11. This version allows the client computer 3 to request that the netserver be bound to a given CPU on the server computer 2. Using this feature, the netperf tests were started on the client 3 by requesting that the netserver be bound to CPU3 6.1. The objective is to demonstrate the gain achieved by moving netserver to the processor on which the incoming network data packets are processed. In this case, this would be CPU0 6.4. The operating system on which the tests were performed was an LR version of HP-UX 11.23. For the purpose of this test, results with both process migration (feature turned on) and without process migration (feature turned off) are presented. TCP_STREAM and TCP_RR tests were run. The tests were run with different combinations of request and response sizes, and the CPU utilization on the server was measured and plotted in a chart. It can be seen that the system performs much better with less CPU utilization when the process migration method as proposed in accordance with embodiments of the technique is applied.

Figure 5A:
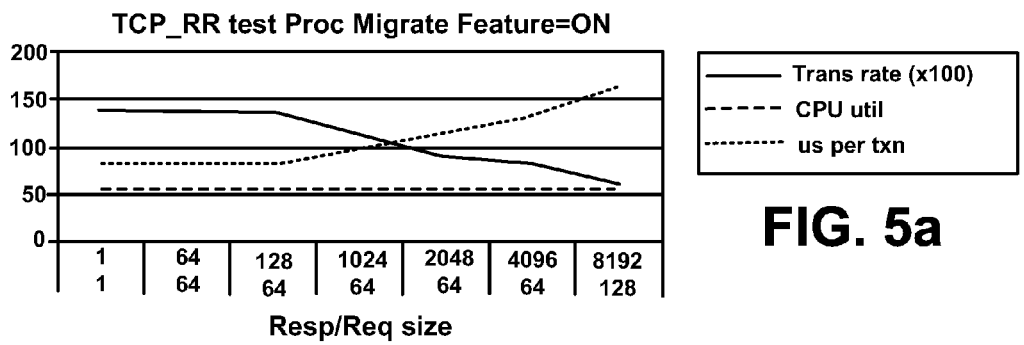
FIGS. 5a, b illustrates results of a TCP_STREAM test, with the process migration feature turned on and off, respectively.
Figure 5B:
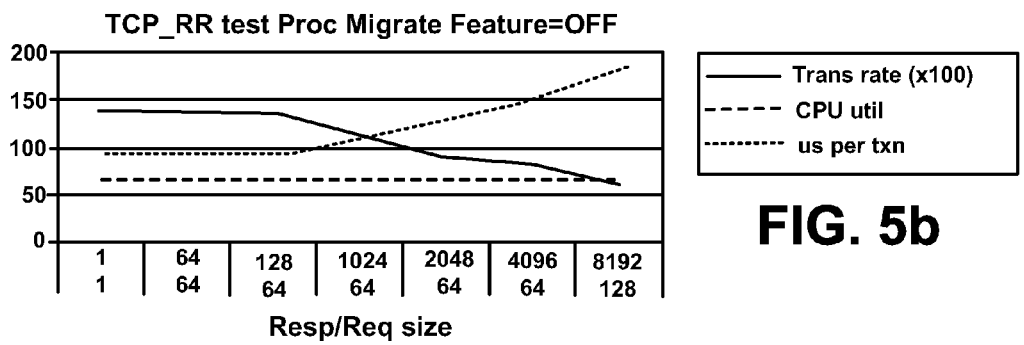
Figure 6A:
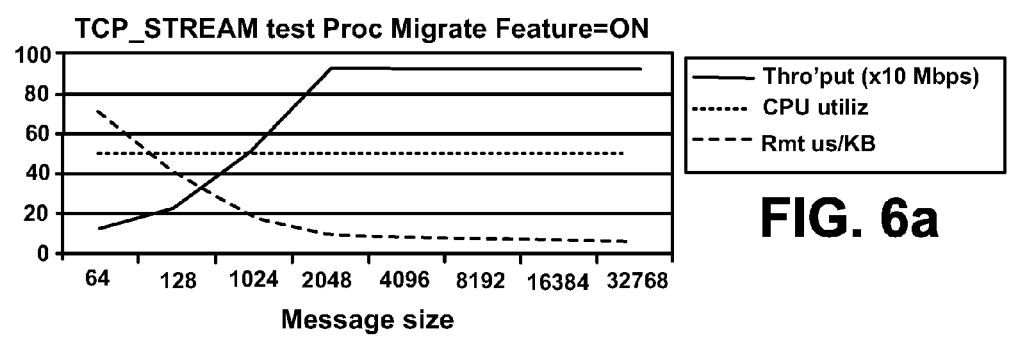
FIGS. 6a, b illustrates are results of a TCP_RR test, with the process migration feature turned on and off, respectively.
Figure 6B:
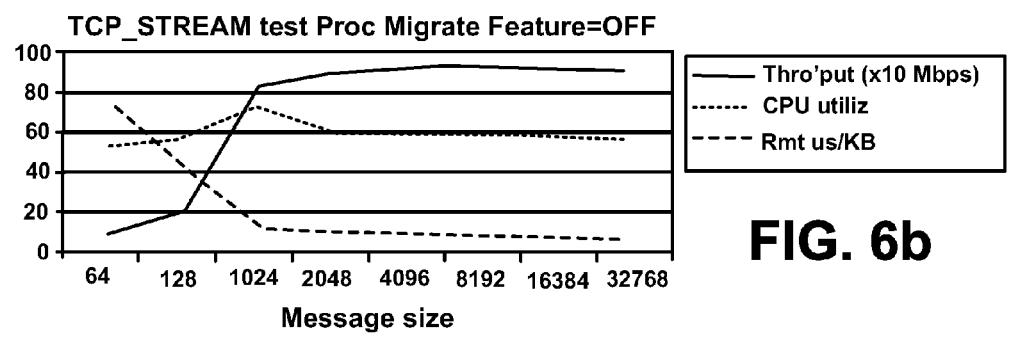

FIGS. 5*a*, *b* and 6*a*, *b* show the test results, wherein FIGS. 5*a* and 6*a* refer to test scenarios without process migration ("Proc Migrate Feature=OFF") and FIGS. 5*b* and 6*b* refer to test scenarios with process migration turned on. In both TCP_RR (FIGS. 5*a*, *b*) and TCP_STREAM tests (FIGS. 6*a*, *b*) it can be seen that the CPU utilization (dashed curve in FIGS. 5*a*, *b*; dotted curve in FIGS. 6*a*, *b*) is significantly reduced when the process in question, i.e. the application 8, is migrated to the incoming CPU, i.e. the CPU 6.4 on which the network data packets are arriving: "Proc Migrate Feature=ON" in FIGS. 5*b*, 6*b*. Furthermore, it can also be noticed that the time required per transaction (measured in microseconds [µs] in case of TCP_RR; dotted curve in FIGS. 5*a*, *b*) and the required transfer time per kilobyte of data (measured in microseconds [µs] in case of TCP_STREAM; dashed curve in FIGS. 6*a*, *b*) is also reduced. Combining this fact with the observation that transaction rate and throughput as such remain the same, it can be concluded that with the method proposed here, the same transaction rate and throughput can be achieved with much less CPU power.

Embodiments of the disclosed technique are particularly advantageous as they provide a method for improving performance of networking applications which receive data from a computer network and which are executable on any one of a plurality of data processing means. Further, a network server computer is provided that can be employed for use in a computer network.

Further, a computer program product for use on a network server computer is provided that can improve performance of networking applications that receive application data from a computer network and that are executable on any one of a plurality of data processing means comprised in the network server computer.

Although the technique has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A method for improving performance of networking applications which receive network data from a computer network and which are executable on any one of a plurality of data processing means of a network server computer, comprising:
   establishing a data transfer connection between a first data processing means of the plurality of data processing means of the network server computer and the computer network;
   sending data on said data transfer connection by means of a given networking application of a plurality of networking applications executable on the network server computer, said given networking application running on a second data processing means of the plurality of data processing means of the network server computer;
   determining a data transfer rate of said data transfer connection from the sent data;
   storing an identification of the first data processing in an encapsulating data structure encapsulating the network data for propagation to a transport layer of the network server computer; and
   causing the transport layer of the network server computer to move the networking application to the first data processing means of the network server computer if the data transfer rate exceeds a predefined threshold.

2. The method according to claim 1, further comprising the steps of, prior to establishing said data transfer connection:
   receiving network data from the computer network by means of at least one of a plurality of network interface cards;
   said network interface card interrupting at least the first data processing means; and
   the first data processing means processing said network data to establish said data transfer connection.

3. The method according to claim 1, wherein the data sent by the given networking application essentially comprises system calls by said networking application for obtaining application data from said data transfer connection.

4. The method according to claim 1, wherein an identification of the first data processing means is stored in a socket data structure associated with said data transfer connection on transport layer for retrieving an identity of the first data processing means and for moving the given networking application to the first data processing means.

5. A network server computer for use in a computer network, comprising:
   a plurality of data processing means;
   storage means comprising a plurality of networking applications executable on essentially any one of said data processing means; and
   a plurality of network interface cards, each of said network interface cards being associated and in operative connection with at least one of said data processing means, wherein the network interface cards are adapted to interrupt the associated data processing means upon receiving network data from the computer network, wherein a given data processing means is adapted for establishing a data transfer connection with the computer network upon interruption by one of said network interface cards, and wherein a given networking application is adapted to receive application data from the computer network on said data transfer connection, the network server computer further comprising at least a first program code mechanism adapted to move said given networking application to said given data processing means and operable if a data transfer rate of said data transfer connection exceeds a predetermined threshold value, and a second program code mechanism operable on a network layer, the second program code mechanism configured to capture an identification of said given data processing means in an encapsulating data structure comprising the network data and transfer the encapsulating data structure to a transport layer.

6. The network server computer according to claim 5, further comprising a third program code mechanism adapted to retrieve said identification from the encapsulating data structure and to store said identification in a socket data structure associated with said data transfer connection, said socket data structure being accessible by the first program code mechanism for retrieving said identification.

7. The network server computer according to claim 5, further comprising a fourth program code mechanism adapted to determine a start time of said data transfer connection, an amount of data transferred on said data transfer connection since said start time, and a present time, and to determine a data transfer rate on said data transfer connection from a difference between the present time and the start time and the amount of transferred data.

8. The network server computer according to claim 5, wherein said transferred data essentially constitutes system calls by said given networking application.

9. A computer network, comprising:
   at least one client computer;
   at least one network server computer; and
   at least one data link connecting the at least one client computer with the at least one network server computer,
   said network server computer comprising:
   a plurality of data processing means within each of the at least one network server computer;
   a plurality of networking applications executable on any one of said data processing means; and
   a plurality of network interface cards, each of said network interface cards being associated and in operative connection with at least one of said data processing means, wherein the network interface cards are adapted to interrupt the associated data processing means upon receiving network data from the client computer, wherein a given data processing means is adapted for establishing a data transfer connection with the client computer upon interruption by one of said network interface cards, and wherein a given networking application is adapted to receive application data from the client computer on said data transfer connection, the network server computer further comprising at least a first program code mechanism adapted to move said given networking application to said given data processing means and operable if a data transfer rate of said data transfer connection exceeds a predetermined threshold value, and a second program code mechanism configured to capture an identification of the given data processing means in an encapsulating data structure comprising the network data and transfer the encapsulating data structure to a transport layer.

10. The computer network according to claim 9, wherein the network server computer further comprises a third program code mechanism adapted to retrieve said identification from the encapsulating data structure and to store said identification in a socket data structure associated with said data transfer connection, said socket data structure being accessible by the first program code mechanism for retrieving said identification.

11. The computer network according to claim 9, wherein the network server computer further comprises a fourth program code mechanism adapted to determine a start time of said data transfer connection, an amount of data transferred on said data transfer connection since said start time, and a present time, and to determine a data transfer rate on said data transfer connection from a difference between the present time and the start time and the amount of transferred data.

12. The computer network according to claim 9, wherein said transferred data essentially constitutes system calls by said given networking application.

13. A computer readable medium having a computer program stored thereon and executable by a network server computer wherein, for improving performance of networking applications which receive application data from a computer network and which are executable on any one of a plurality of data processing means of the network server computer, the computer program being operable to:
  establish a data transfer connection between a first data processing means of the plurality of data processing means of the network server computer and the computer network;
  send data on said data transfer connection by means of a given networking application of a plurality of networking applications, said given networking application running on a second data processing means of the plurality of data processing means of the network server computer;
  determine a data transfer rate of said data transfer connection from the sent data; and
  storing an identification of the first data processing means in an encapsulating data structure encapsulating the network data for propagation to a transport layer of the network server computer; and causing the transport layer of the network server computer to move moving the given the networking application to the first data processing means of the network server computer if the data transfer rate exceeds a predefined threshold.

14. The computer readable medium having the computer program according to claim 13 stored thereon, the computer program further being operable to, prior to establishing said data transfer connection:
  receive network data from the computer network by means of at least one of a plurality of network interface cards;
  transfer the network data to at least the first data processing means; and
  process the network data by means of the first data processing means to establish said data transfer connection.

* * * * *